(12) United States Patent
Kawao (10) Patent No.: US 9,396,747 B2
(45) Date of Patent: Jul. 19, 2016

(54) INTERLEAVE CIRCUIT OF CONDUCTIVE CIRCUIT PORTION OF DISK DRIVE FLEXURE

(71) Applicant: NHK SPRING CO., LTD., Yokohama-shi, Kanagawa (JP)

(72) Inventor: Sei Kawao, Aiko-gun (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/836,624

(22) Filed: Aug. 26, 2015

(65) Prior Publication Data
US 2016/0071533 A1    Mar. 10, 2016

(30) Foreign Application Priority Data

Sep. 4, 2014 (JP) .................................. 2014-180247

(51) Int. Cl.
*G11B 21/16* (2006.01)
*G11B 5/48* (2006.01)

(52) U.S. Cl.
CPC ................ *G11B 5/486* (2013.01); *G11B 21/16* (2013.01)

(58) Field of Classification Search
CPC ........... G11B 5/48; G11B 5/486; G11B 21/16
USPC ................................................ 360/245–245.9
See application file for complete search history.

(56) References Cited

U.S. PATENT DOCUMENTS

| 7,923,644 | B2 | 4/2011 | Ishii et al. | |
|---|---|---|---|---|
| 2010/0290160 | A1* | 11/2010 | Arai | G11B 5/484 360/245.8 |

FOREIGN PATENT DOCUMENTS

| JP | 4547035 B2 | 9/2010 |
|---|---|---|
| JP | 2013182649 A | 9/2013 |

* cited by examiner

*Primary Examiner* — Allen T Cao
(74) *Attorney, Agent, or Firm* — Holtz, Holtz & Volek PC (57) ABSTRACT

An interleave circuit includes a metal base, an insulating layer, a first conductor member having first branch conductors, a second conductor member having second branch conductors, and a jumper conductor, which is a part of the metal base. The jumper conductor includes a branch-side metal portion, a pad-side metal portion, and a bridge portion. The bridge portion is formed between the branch-side metal portion and the pad-side metal portion. The branch-side metal portion electrically conducts to connecting terminals of the first branch conductors via branch-side connecting members. The pad-side metal portion electrically conducts to an electrode pad via a pad-side connecting member. The bridge portion includes a crossover portion which crosses over a third conductor member.

9 Claims, 10 Drawing Sheets

INTERLEAVE CIRCUIT OF CONDUCTIVE CIRCUIT PORTION OF DISK DRIVE FLEXURE

CROSS-REFERENCE TO RELATED APPLICATIONS

This application is based upon and claims the benefit of priority from prior Japanese Patent Application No. 2014-180247, filed Sep. 4, 2014, the entire contents of which are incorporated herein by reference.

BACKGROUND OF THE INVENTION

1. Field of the Invention

The present invention relates to a conductive circuit portion of a flexure used in a disk drive for an information processing apparatus such as a personal computer, in particular, relates to an interleave circuit.

2. Description of the Related Art

A hard disk drive (HDD) is used in an information processing apparatus such as a personal computer. The hard disk drive comprises a magnetic disk rotatable about a spindle, carriage turnable about a pivot, etc. A disk drive suspension is disposed on an arm of the carriage.

The disk drive suspension comprises a baseplate, a load beam, etc. A flexure is located on the load beam. A slider is mounted on a gimbal portion formed near a distal end of the flexure. The slider is provided with elements (transducers) for accessing data, that is, for reading or writing data. The suspension, the flexure, etc., constitute a head gimbal assembly.

Various types of flexures have been put to practical use according to the required specification. A flexure with conductors, for example, is known. A conductive circuit portion of the flexure with conductors includes a metal base made of a thin stainless steel plate, an insulating layer made of an electrically insulating material, such as polyimide, which is formed on the metal base, a plurality of copper conductor members which are formed on the insulating layer, etc. Ends of the conductor members are connected to elements (for example, an MR element: a magneto resistive transducer) of the slider. The other ends of the conductor members are connected to an amplifier or the like of the disk drive.

The impedance of a conductive circuit portion of the flexure is expected to be reduced in order to match the amplifier and the elements of the slider and also to reduce energy consumption. The inductance is also expected to be reduced. Further, to enable higher-speed data transfer, properties that attenuation is low even in a high-frequency band (i.e., low-attenuation properties) are required. In order to meet such a requirement, a flexure with conductors comprising multi-trace transmission lines is effective. A conductive circuit portion comprising the multi-trace transmission lines is also called an interleave circuit. A flexure comprising the interleave circuit is suitable for high-speed data transfer since attenuation in a high-frequency band is low.

JP 4547035 B (Patent Document 1) or JP 2013-182649 A (Patent Document 2) discloses an example of an interleave circuit. Each of conductor members of the interleave circuit diverges into two lines. However, according to the study of the inventors of the present invention, it has been found that increasing the number of divergence of each of the conductor members (the number of branch conductors) enables the achieving of lower impedance and lower attenuation.

However, in a conventional interleave circuit, the more the number of branch conductors is increased, the more the connecting terminals of those branch conductors are increased. These connecting terminals are connected to an electrode pad via conductive members such as bonding members, respectively. Accordingly, an increase in the number of connecting terminals means that the number of conductive members is increased, and the interconnect structure of the connecting terminals with respect to the electrode pad also becomes complicated. Consequently, a problem arises that it becomes difficult to arrange a conductor branch portion within a limited narrow area of the conductive circuit portion.

BRIEF SUMMARY OF THE INVENTION

Accordingly, the object of the present invention is to provide an interleave circuit capable of simplifying the structure of a conductor branch portion, and arranging the conductor branch portion within a narrow area of a conductive circuit portion of a flexure.

One embodiment relates to an interleave circuit of a conductive circuit portion of a disk drive flexure which comprises: a metal base formed of a metal plate such as stainless steel; an insulating layer which is formed on the metal base, and comprises a first surface which is in contact with the metal base and a second surface which is on a side opposite to the metal base; a first conductor member which is disposed on the second surface of the insulating layer, and connected to a first electrode pad; and a second conductor member which is disposed on the second surface of the insulating layer, and connected to a second electrode pad. Here, the interleave circuit comprises: a plurality of first branch conductors which constitute the first conductor member; a plurality of second branch conductors which constitute the second conductor member, and is disposed alternately with the first branch conductors along the first branch conductors; and a jumper conductor having an independent shape which is a part of the metal base, and electrically Insulated from a metal base body portion. The jumper conductor comprises a branch-side metal portion, a pad-side metal portion, and a bridge portion. The branch-side metal portion is formed at a position corresponding to connecting terminals of the first branch conductors, respectively, and electrically conducts to the connecting terminals via branch-side connecting members which penetrate through the insulating layer in a thickness direction of the insulating layer. The pad-side metal portion is formed at a position corresponding to the first electrode pad, and electrically conducts to the first electrode pad via a pad-side connecting member which penetrates through the insulating layer in the thickness direction. The bridge portion is formed between the branch-side metal portion and the pad-side metal portion.

According to the structure of this embodiment, not only can the structure of the conductor branch portion of the interleave circuit be simplified, but the conductor branch portion can be structured to be compact.

In one embodiment, the interleave circuit may further comprise a third conductor member passing through a space between the first electrode pad and the connecting terminals on the second surface of the insulating layer, and the bridge portion may comprise a crossover portion which crosses over the third conductor member.

In one example of the jumper conductor, the length of the branch-side metal portion is greater than the length of the pad-side metal portion, and the width of the bridge portion is less than the length of the pad-side metal portion. Further, the branch-side metal portion may extend in a longitudinal direction of the conductive circuit portion, the connecting terminals may be arranged to be spaced apart from each other in the longitudinal direction of the conductive circuit portion, and the bridge portion may have a shape of extending in a width direction of the conductive circuit portion. Furthermore, the conductive circuit portion may include a pair of conductor members for writing and a pair of conductor members for reading which are connected to a magnetic head, a conductor member, which is one of the pair of conductor members for writing, may comprise the first branch conductors, and the other conductor member for writing may comprise the second branch conductors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An interleave circuit of a conductive circuit portion of a first embodiment of the present invention will now be described with reference to FIGS. 1 to 13.

Figure 1:
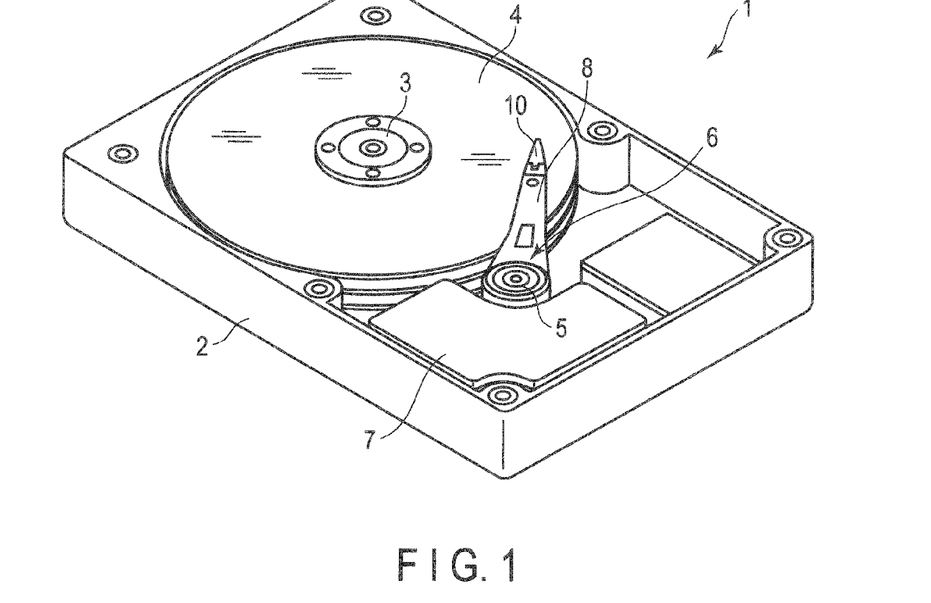
FIG. 1 is a perspective view showing an example of a disk drive comprising a suspension.

A hard disk drive (hereinafter referred to as a disk drive) 1 shown in FIG. 1 comprises a case 2, magnetic disks 4 rotatable about a spindle 3, a carriage 6 turnable about a pivot 5, and a positioning motor 7 for turning the carriage 6. The case 2 is sealed by a lid which is not shown.

Figure 2:
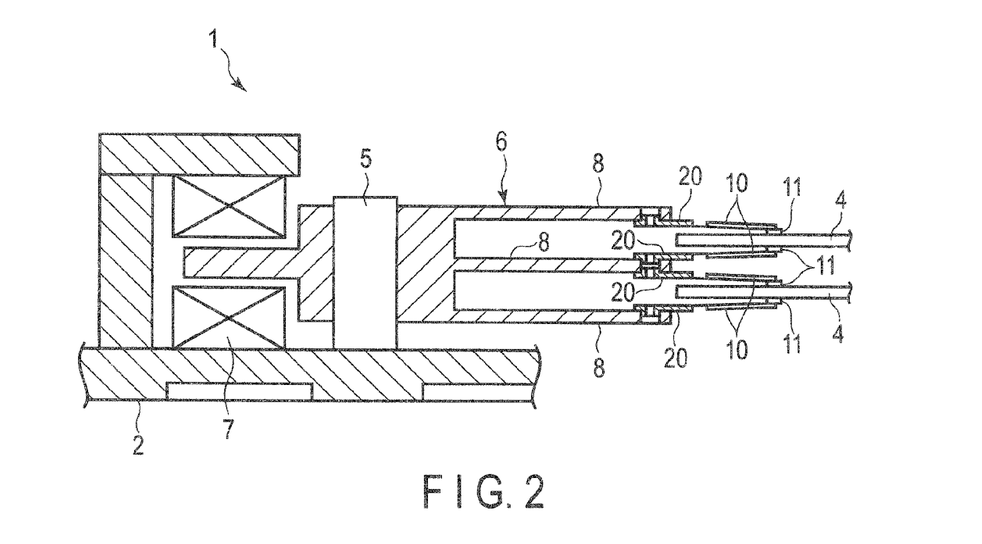
FIG. 2 is a cross-sectional view of a part of the disk drive shown in FIG. 1.

FIG. 2 is a sectional view typically showing a part of the disk drive 1. As shown in FIG. 2, the carriage 6 comprises a plurality of (e.g., three) actuator arms 8. Suspensions 10 are mounted individually on the respective distal end portions of the actuator arms 8. A slider 11, which constitutes a magnetic head, is disposed on the distal end of each of the suspensions 10.

When the magnetic disks 4 rotate at high speed about the spindle 3, an air bearing is formed between each of the disks 4 and the sliders 11. If the carriage 6 is turned by the positioning motor 7, each slider 11 moves to a desired track of the magnetic disk 4. The slider 11 is provided with a write element such as a magnetic coil for recording data in the magnetic disk 4, and a read element such a magneto resistive (MR) element which converts magnetic signals into electrical signals. By means of these elements, data can be accessed, that is, written to or read from the recording surface of the disk 4.

Figure 3:
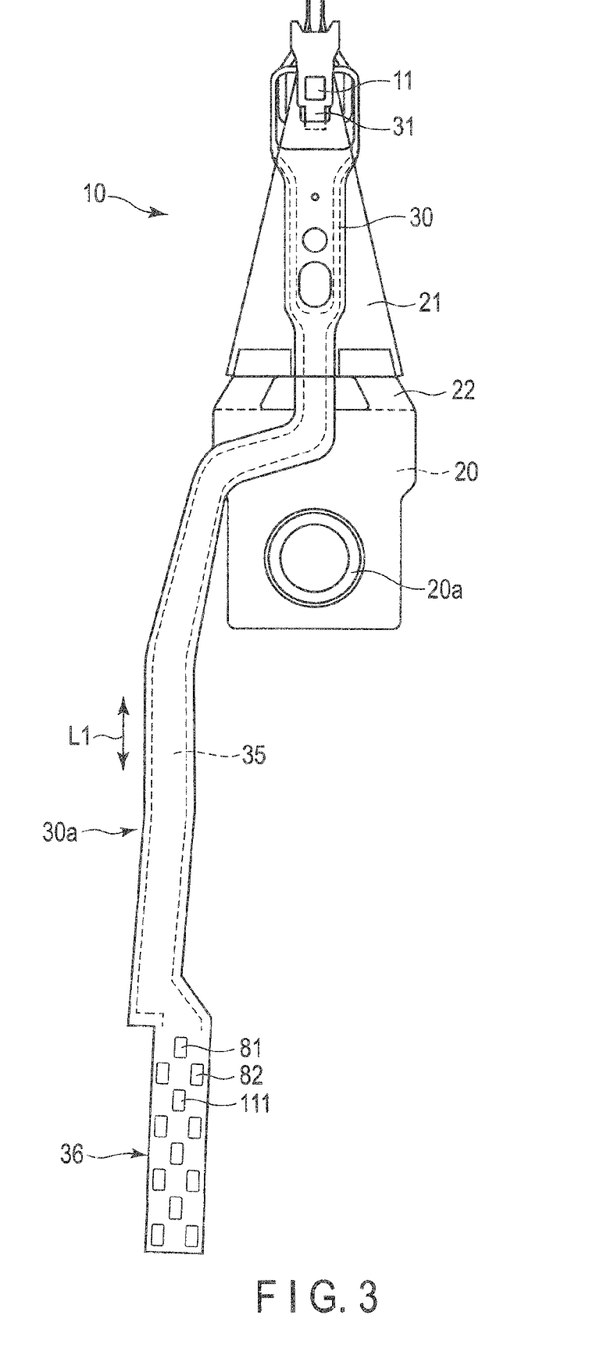
FIG. 3 is a plan view of a head gimbal assembly comprising a disk drive flexure according to a first embodiment.

FIG. 3 shows an example of a head gimbal assembly comprising the suspension 10. The suspension 10 comprises a baseplate 20, a load beam 21, and a hinge portion 22. A boss portion 20a of the baseplate 20 is secured to the actuator arm 8 (FIGS. 1 and 2).

The suspension 10 is provided with a flexure 30 with conductors. The flexure 30 with conductors will hereinafter be referred to simply as the flexure 30. The flexure 30 is arranged along the load beam 21, and fixed to the load beam 21 by fixing means such as laser welding. A tongue 31, which functions as a gimbal portion, is formed near the distal end of the flexure 30. The slider 11 is mounted on the tongue 31. A tail portion 30a of the flexure 30 extends toward the back of the baseplate 20.

The flexure 30 comprises a conductive circuit portion 35. The conductive circuit portion 35 extends in the longitudinal direction of the flexure 30 (i.e., the direction indicated by double-headed arrow L1 in FIG. 3). One end of the conductive circuit portion 35 is connected to the aforementioned elements of the slider 11 which functions as the magnetic head. The other end of the conductive circuit portion 35 is connected to an amplifier of the disk drive 1 via a tail pad portion 36.

Figure 4:
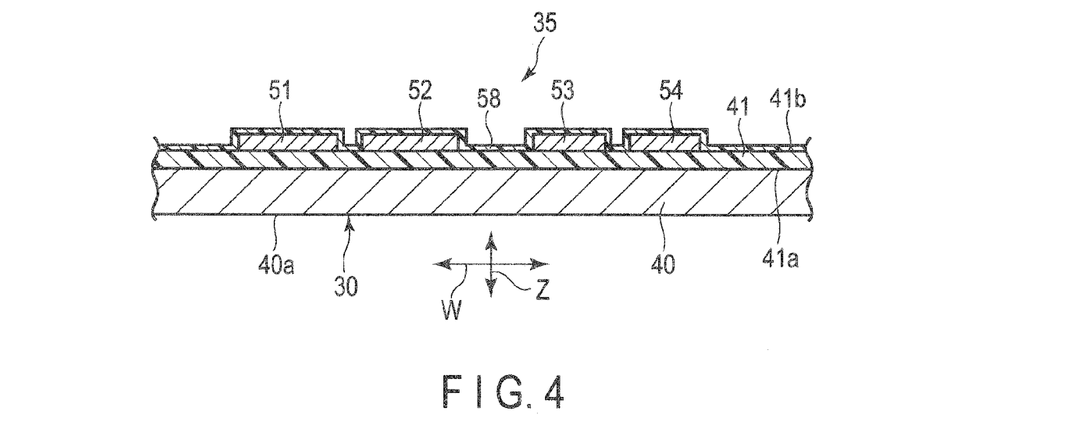
FIG. 4 is a cross-sectional view of a part of a conductive circuit portion of the disk drive flexure shown in FIG. 3.

FIG. 4 shows a cross-section of a part of the conductive circuit portion 35 along the width direction. Double-headed arrow W in FIG. 4 indicates the width direction of the conductive circuit portion 35. Double-headed arrow Z indicates the thickness direction of the conductive circuit portion 35. The conductive circuit portion 35 includes a metal base 40, an insulating layer 41 formed on the metal base 40, a pair of conductor members 51 and 52 for writing which is formed on the insulating layer 41, a pair of conductor members 53 and 54 for reading which is also formed on the insulating layer 41, and a cover layer 58 covering the conductor members 51 to 54.

The metal base 40 is formed of a metal plate of austenitic stainless steel, for example. The metal base 40 is thinner than the load beam 21, and is 15 to 20 μm (for example, 18 μm) thick. The load beam 21 is, for example, 30 to 62 μm thick.

The insulating layer 41 includes a first surface 41a facing the metal base 40, and a second surface 41b which is on the side opposite to the first surface 41a. The insulating layer 41 and the cover layer 58 are both made of an electrically insulating resin, such as polymide. The thickness of the insulating layer 41 is, for example, 10 μm. The thickness of the cover layer 58 is, for example, 4 μm.

The conductor members 51 to 54 are made of a highly electrically conductive metal, such as plating copper (pure copper), and disposed on the second surface 41b of the insulating layer 41. The conductor members 51 to 54 are formed into predetermined patterns by, for example, plating or etching, along the second surface 41b of the insulating layer 41. The thickness of the conductor members 51 to 54 is, for example, 5 µm. The conductor members 51 to 54 extend in the longitudinal direction of the flexure 30 along the longitudinal direction of the conductive circuit portion 35. The conductor members 51 and 52 for writing are connected to the write element (for example, the magnetic coil) of the slider 11. The conductor members 53 and 54 for reading are connected to the read element (for example, the MR element) of the slider 11.

Figure 5:
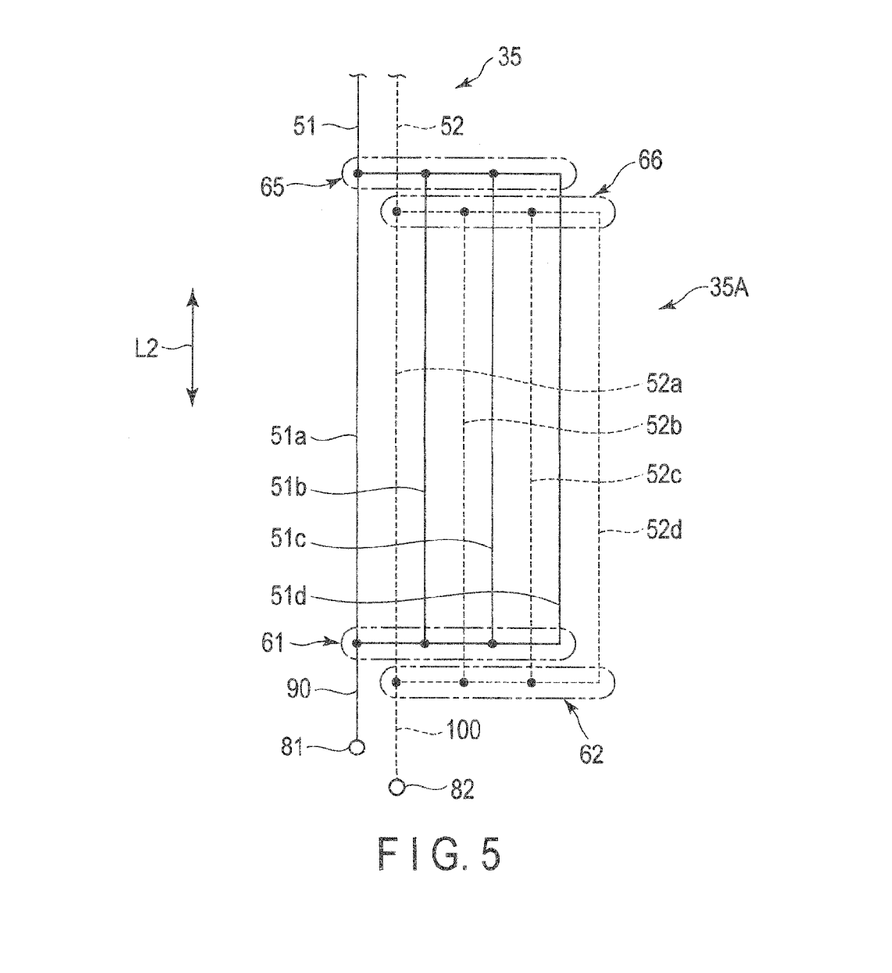
FIG. 5 is a circuit diagram which schematically shows an interleave circuit of the disk drive flexure shown in FIG. 3.

As shown in FIG. 5, the conductive circuit portion 35 includes an interleave circuit 35A. FIG. 5 is a circuit diagram schematically showing the interleave circuit 35A. Double-headed arrow L2 in FIG. 5 indicates the longitudinal direction of the interleave circuit 35A (the direction in which the conductors are arranged), that is, the longitudinal direction of the flexure 30. The interleave circuit 35A is formed at a part of the conductor members 51 and 52 for writing in the longitudinal direction of the conductor members 51 and 52. The conductive circuit portion 35 including the interleave circuit 35A can increase a bandwidth of a high-frequency pulse which is transmitted when writing data to a disk, and also reduce a loss of a write current.

The interleave circuit 35A includes four first branch conductors 51a, 51b, 51c, and 51d which constitute the first conductor member 51, and four second branch conductors 52a, 52b, 52c, and 52d which constitute the second conductor member 52. The branch conductors 51a to 51d and 52a to 52d are formed on the second surface 41b of the insulating layer 41 by plating or etching. The branch conductors 51a to 51d and 52a to 52d are covered by the cover layer 58.

As shown in FIG. 5, at one of end portions of the interleave circuit 35A, a conductor branch portion 61 of the first conductor member 51, and a conductor branch portion 62 of the second conductor member 52 are formed. In the first conductor branch portion 61, the first conductor member 51 branches into four first branch conductors 51a, 51b, 51c, and 51d. In the second conductor branch portion 62, the second conductor member 52 branches into four second branch conductors 52a, 52b, 52c, and 52d.

At the other end portion of the interleave circuit 35A, a merging portion 65 of the first conductor member 51, and a merging portion 66 of the second conductor member 52 are formed. In the first merging portion 65, the four first branch conductors 51a, 51b, 51c, and 51d merge into one conductor member 51. In the second merging portion 66, the four second branch conductors 52a, 52b, 52c, and 52d merge into one conductor member 52. The first branch conductors 51a to 51d and the second branch conductors 52a to 52d are arranged alternately in the width direction of the interleave circuit 35A so that the parallel relationship can be substantially kept. Since the conductor merging portions 65 and 66 are structured in substantially the same way as the conductor branch portions 61 and 62, the conductor branch portions 61 and 62 will be described as a typical example of these portions.

Figure 6:
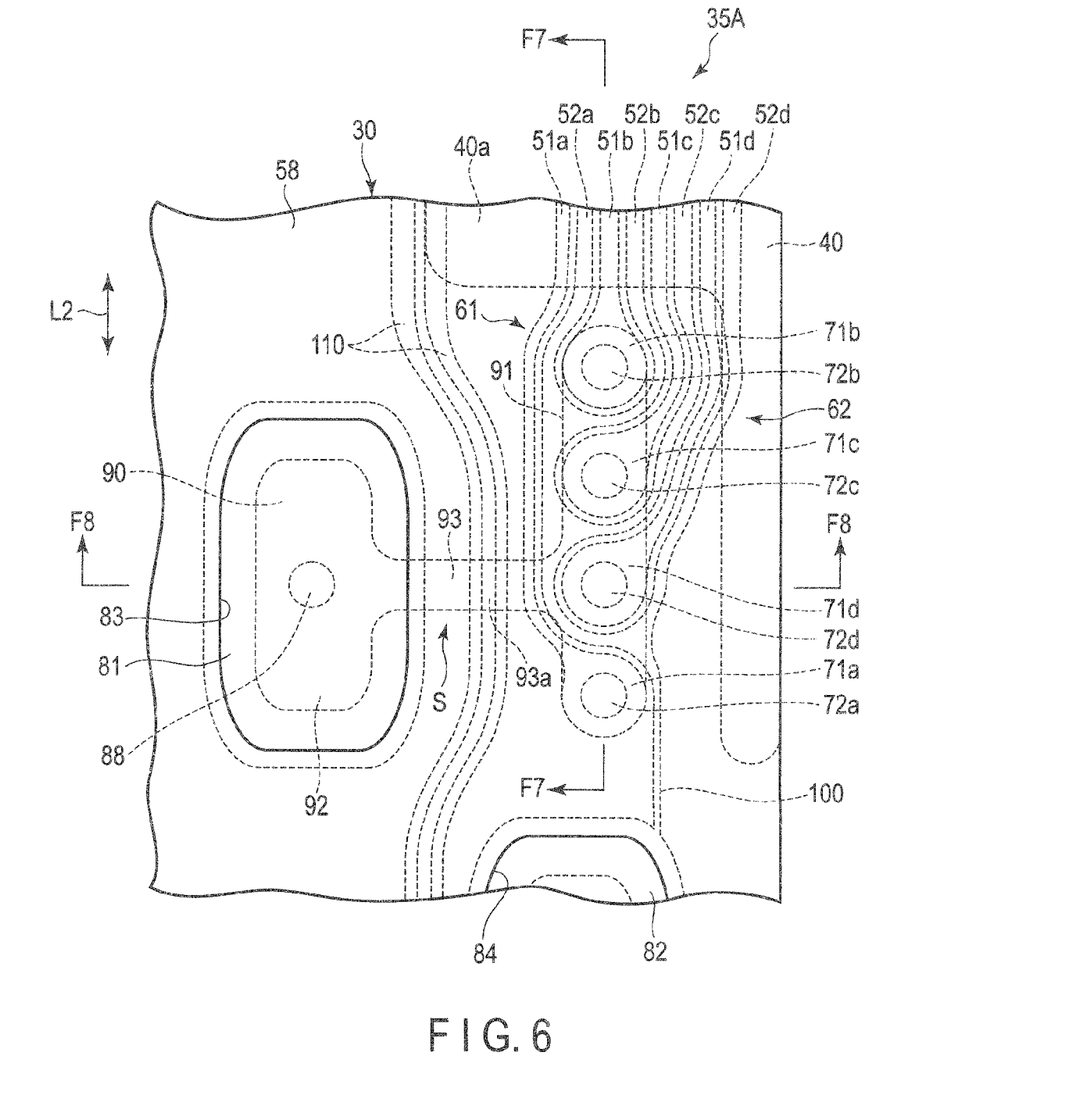
FIG. 6 is a plan view showing a part of the interleave circuit of the disk drive flexure shown in FIG. 3.
Figure 7:
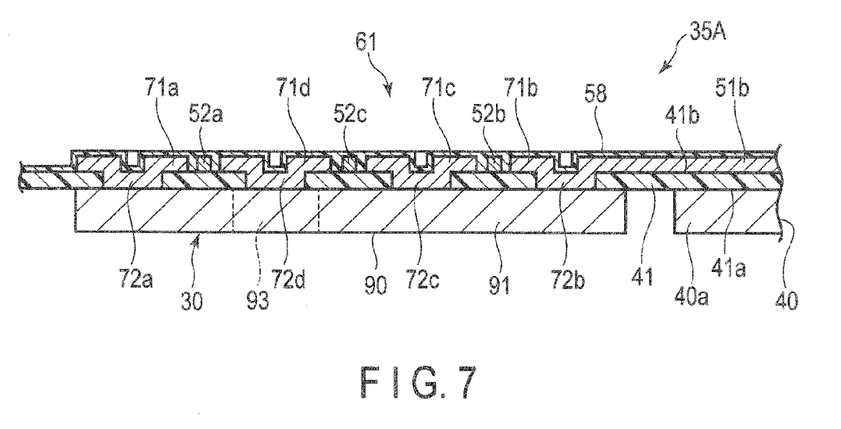
FIG. 7 is a cross-sectional view of a part of the interleave circuit taken along line F7-F7 of FIG. 6.
Figure 8:
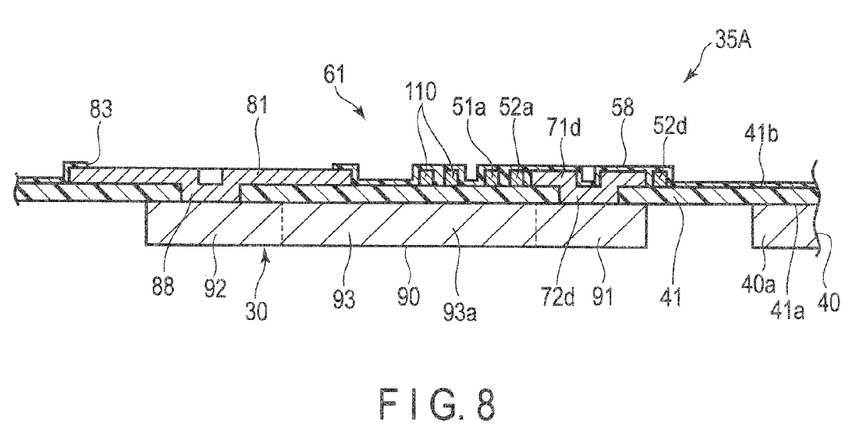
FIG. 8 is a cross-sectional view of a part of the interleave circuit taken along line F8-F8 of FIG. 6.
Figure 9:
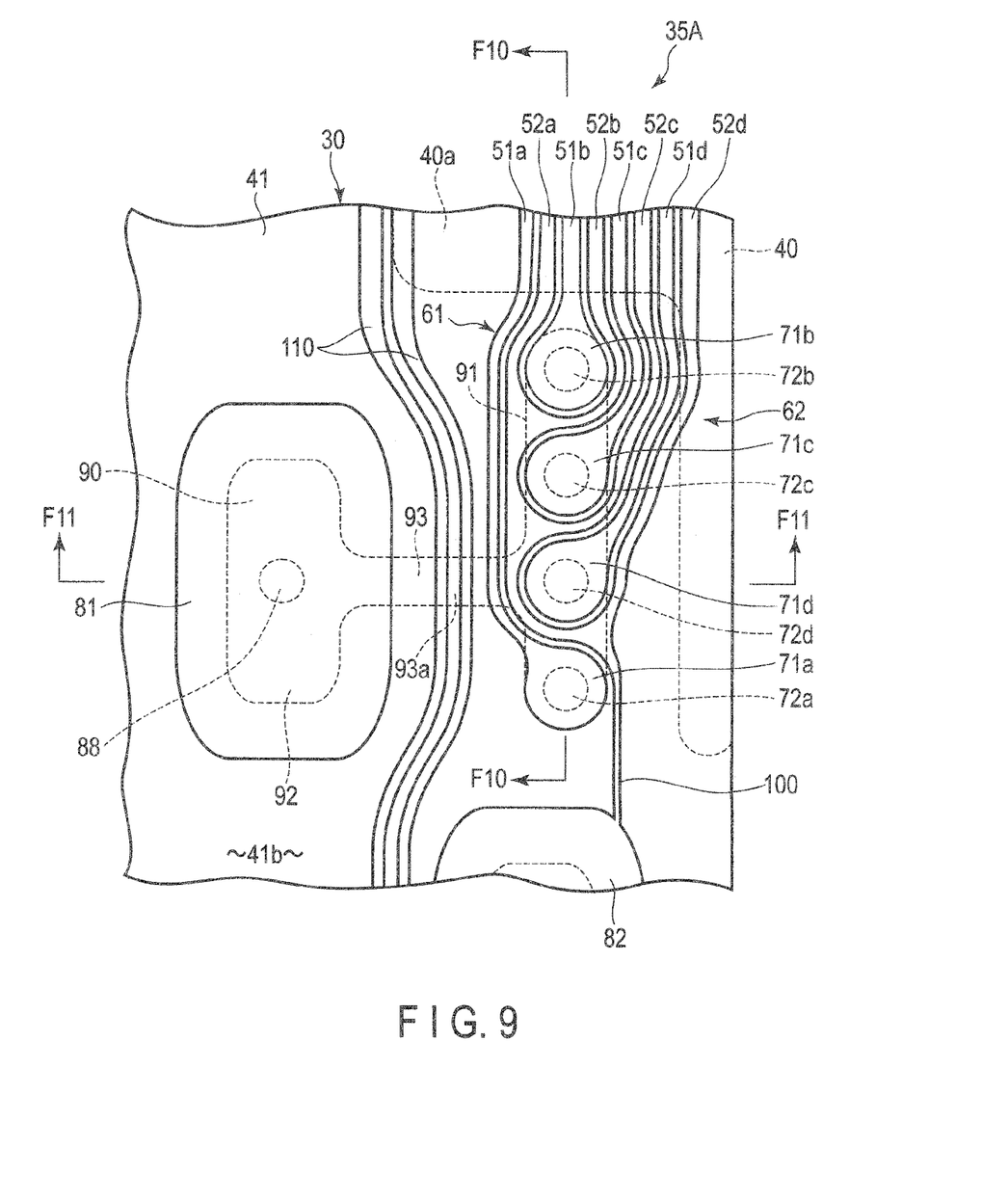
FIG. 9 is a plan view of a part of the interleave circuit shown in FIG. 6 excluding a cover layer.
Figure 10:
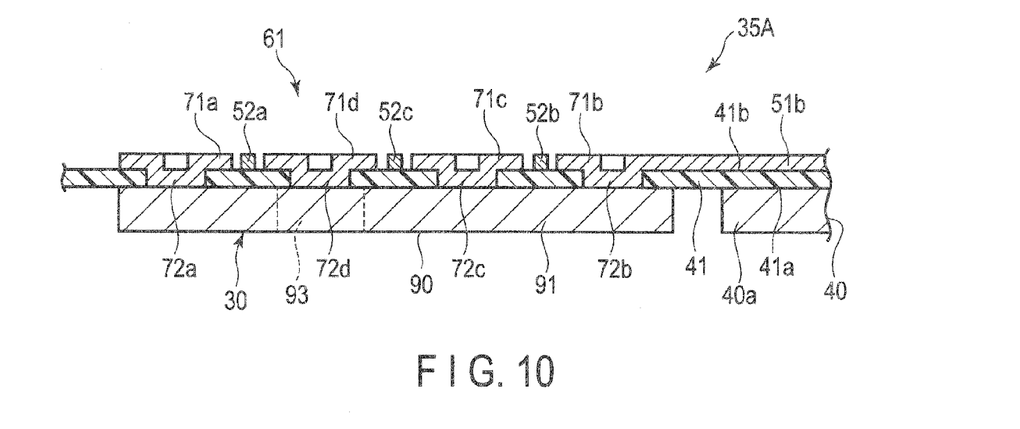
FIG. 10 is a cross-sectional view of a part of the interleave circuit taken along line F10-F10 of FIG. 9.
Figure 11:
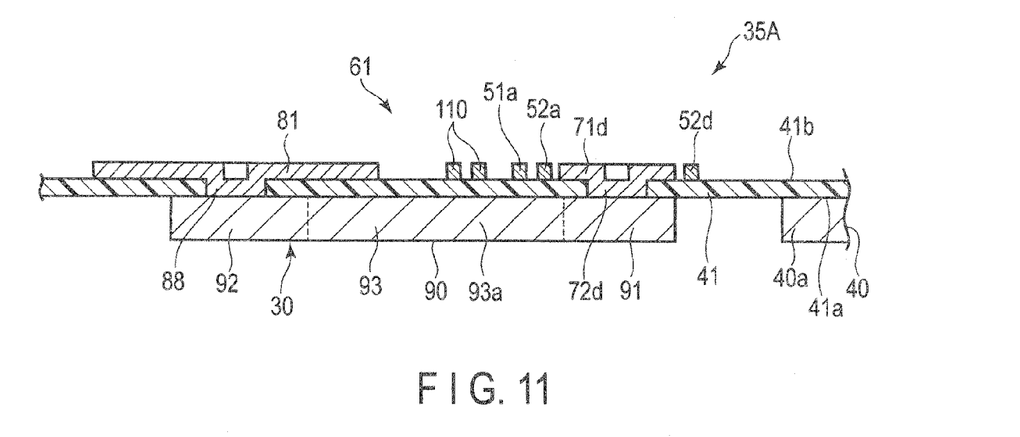
FIG. 11 is a cross-sectional view of a part of the interleave circuit taken along line F11-F11 of FIG. 9.
Figure 12:
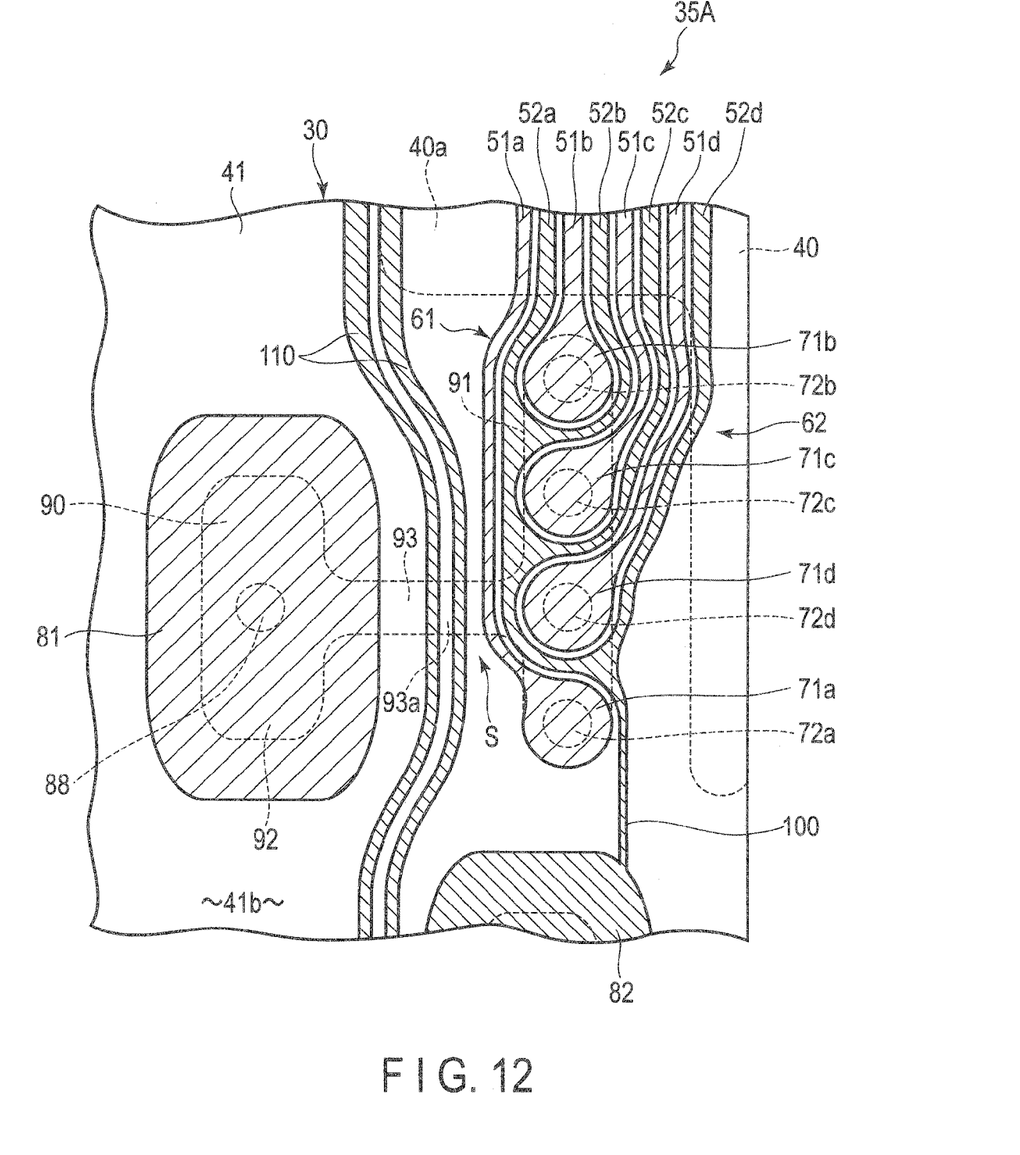
FIG. 12 is a sectional view of a part of the interleave circuit shown in FIG. 6, parallel to a second surface of an insulating layer.

FIG. 6 represents a part of the interleave circuit 35A, and shows the constituent elements such as the first conductor branch portion 61 and the second conductor branch portion 62. FIG. 7 is a sectional view taken along line F7-F7 of FIG. 6. FIG. 8 is a sectional view taken along line F8-F8 of FIG. 6. FIG. 9 shows a part of the interleave circuit 35A with the cover layer 58 removed. FIG. 10 is a sectional view taken along line F10-F10 of FIG. 9. FIG. 11 is a sectional view taken along line F11-F11 of FIG. 9. FIG. 12 is a sectional view of a part of the interleave circuit 35A, parallel to the second surface 41b of the insulating layer 41.

In the first conductor branch portion 61, connecting terminals 71a, 71b, 71c, and 71d are formed at end portions of the first branch conductors 51a, 51b, 51c, and 51d, respectively. The connecting terminals 71a to 71d are arranged in a row substantially equidistantly in the longitudinal direction of the interleave circuit 35A (i.e., the longitudinal direction of the conductive circuit portion 35). The connecting terminals 71a to 71d are made of the same conductive material (copper) as the first branch conductors 51a to 51d and the second branch conductors 52a to 52d.

As shown in FIGS. 7 and 10, branch-side connecting members 72a, 72b, 72c, and 72d are formed at positions corresponding to the connecting terminals 71a, 71b, 71c, and 71d, respectively. The branch-side connecting members 72a to 72d are formed integrally with the connecting terminals 71a to 71d by, for example, copper plating. Each of the branch-side connecting members 72a to 72d penetrates through the insulating layer 41 in the thickness direction.

A first electrode pad 81 is formed near the first conductor branch portion 61. A second electrode pad 82 is formed near the second conductor branch portion 62. The electrode pads 81 and 82 are made of the same conductive material (copper) as the first branch conductors 51a to 51d and the second branch conductors 52a to 52d, and formed on the second surface 41b of the insulating layer 41.

The first electrode pad 81 is connected to an electric circuit on the side of the amplifier via a first bonding member. The second electrode pad 82 is connected to the electric circuit on the side of the amplifier via a second bonding member. In the cover layer 58, openings 83 and 84 (FIGS. 6 and 8) for exposing the first electrode pad 81 and the second electrode pad 82 are formed.

As shown in FIGS. 8 and 11, at a position corresponding to the first electrode pad 81, a pad-side connecting member 88 is formed. The pad-side connecting member 88 is formed integrally with the first electrode pad 81 by, for example, copper plating. The pad-side connecting member 88 penetrates through the insulating layer 41 in the thickness direction.

Figure 13:
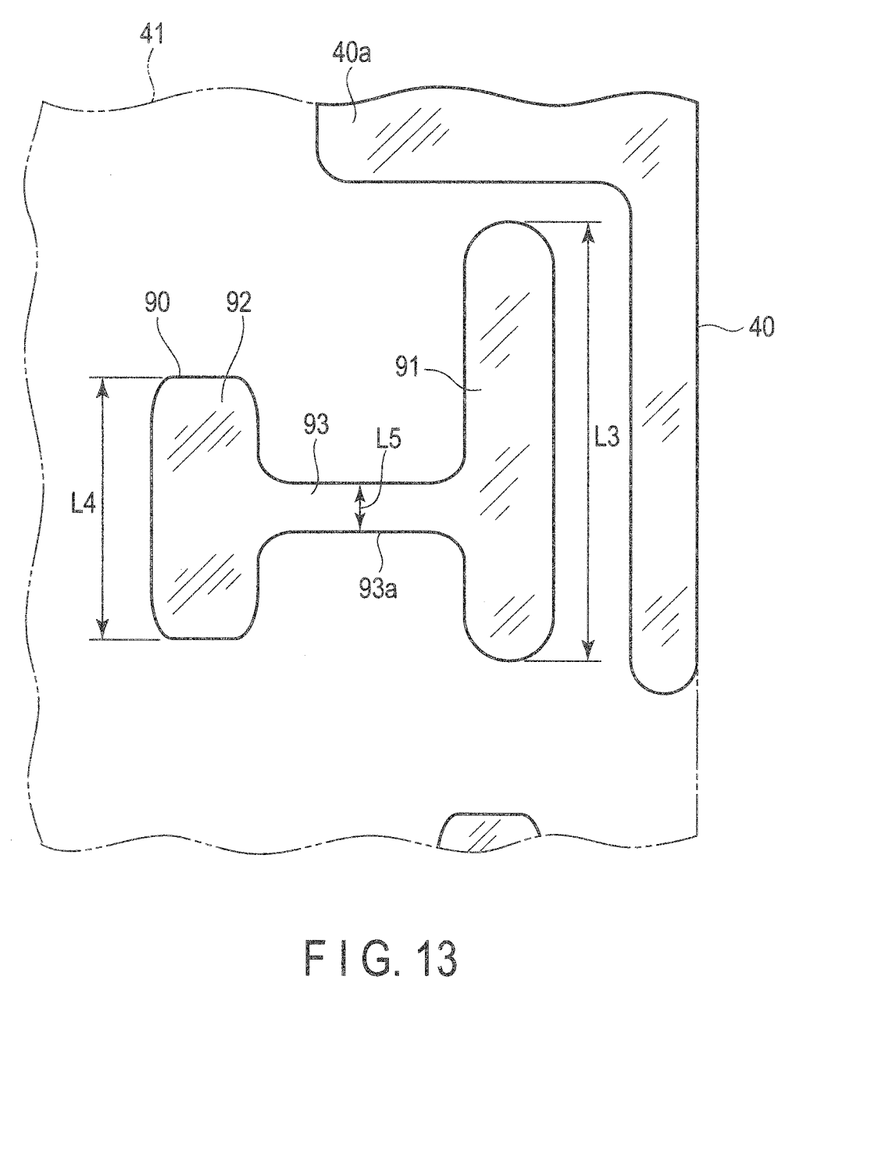
FIG. 13 is a plan view of a jumper conductor of the interleave circuit shown in FIG. 6.

FIG. 13 shows a part of the metal base 40. The metal base 40 includes a metal base body portion 40a which occupies a large part of the metal base 40, and a jumper conductor 90 having a smaller area than the metal base body portion 40a. The jumper conductor 90 is formed to be insular on the second surface 41b of the insulating layer 41 by etching a part of the stainless-steel plate, which is the material of the metal base 40. Accordingly, the thickness of the jumper conductor 90 is the same as the thickness of the metal base body portion 40a. The metal base body portion 40a and the jumper conductor 90 are electrically insulated from each other.

As shown in FIG. 13, the jumper conductor 90 includes a branch-side metal portion 91, a pad-side metal portion 92, and a bridge portion 93. The branch-side metal portion 91 is formed at a place corresponding to the connecting terminals 71a to 71d. The pad-side metal portion 92 is formed at a place corresponding to the first electrode pad 81. The bridge portion 93 is formed between the branch-side metal portion 91 and the pad-side metal portion 92. That is, the branch-side metal portion 91, the pad-side metal portion 92, and the bridge portion 93 are formed integrally with each other.

Length L3 (FIG. 13) of the branch-side metal portion 91 is greater than length L4 of the pad-side metal portion 92. Width L5 of the bridge portion 93 is less than length L4 of the pad-side metal portion 92. The branch-side metal portion 91 extends in the longitudinal direction of the interleave circuit 35A (i.e., the direction shown by arrow L2 in FIG. 6). An area of the branch-side metal portion 91 is greater than an area of the pad-side metal portion 92. The branch-side metal portion 91 extends in the longitudinal direction of the interleave circuit 35A (i.e., the longitudinal direction of the conductive circuit portion 35). The bridge portion 93 extends in the width direction of the interleave circuit 35A.

As shown in FIGS. 7, 9, and 12, the connecting terminals 71a, 71b, 71c, and 71d are arranged in a row in the longitudinal direction of the branch-side metal portion 91. The connecting terminals 71a, 71b, 71c, and 71d electrically conduct to the branch-side metal portion 91 of the jumper conductor 90 via the branch-side connecting members 72a, 72b, 72c, and 72d, respectively.

As shown in FIGS. 8 and 11, the first electrode pad 81 electrically conducts to the pad-side metal portion 92 of the jumper conductor 90 via the pad-side connecting member 88. Accordingly, the first electrode pad 81 electrically conducts to the connecting terminals 71a to 71d of the first branch conductors 51a to 51d via the jumper conductor 90. The second electrode pad 82 electrically conducts to the second branch conductors 52a to 52d via a conduction path 100 (FIGS. 9 and 12).

On the second surface 41b of the insulating layer 41, apart from the conductor members 51 and 52 for writing and the conductor members 53 and 54 for reading, other conductor members (for example, a third conductor member 110 shown in FIGS. 6 to 12) are also disposed according to various purposes. The third conductor member 110 extends in the longitudinal direction of the conductive circuit portion 35 passing through space S between the first electrode pad 81 and the connecting terminals 71a to 71d, and are connected to a third electrode pad 111 (FIG. 3), for example. The third conductor member 110 intersects the bridge portion 93 of the jumper conductor 90 with the insulating layer 41 sandwiched therebetween. That is, the bridge portion 93 comprises a crossover portion 93a which crosses over the third conductor member 110.

Since the jumper conductor 90 is a part of the metal base 40, it is arranged on the first surface 41a of the insulating layer 41. In contrast, the conductor branch portions 61 and 62, the electrode pads 81 and 82, and the third conductor member 110 are arranged on the second surface 41b, which is on the opposite side to the first surface 41a. Accordingly, the jumper conductor 90 is prevented from interfering with the third conductor member 110, and the third conductor member 110 can be passed through space S between the first electrode pad 81 and the conductor branch portion 61.

Figure 14:
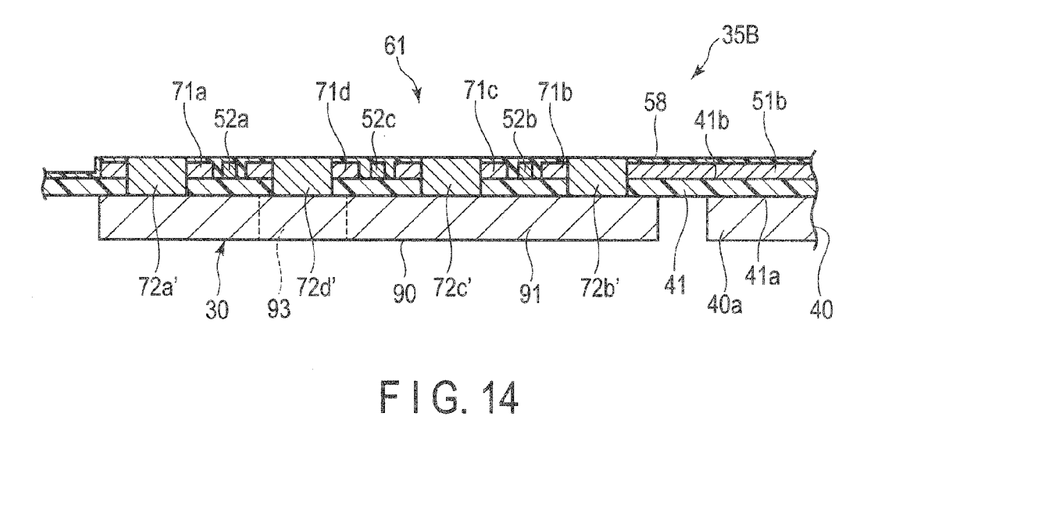
FIG. 14 is a cross-sectional view of a part of an interleave circuit according to a second embodiment, corresponding to FIG. 7.
Figure 15:
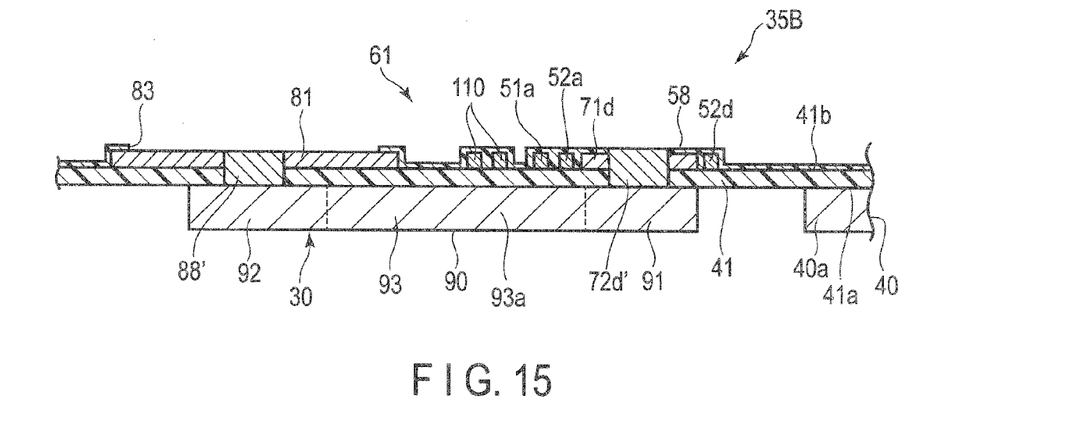
FIG. 15 is a cross-sectional view of a part of the interleave circuit according to the second embodiment of the present invention, corresponding to FIG. 8.

FIGS. 14 and 15 show an interleave circuit 35B according to a second embodiment. Branch-side connecting members 72a', 72b', 72c', and 72d' of this embodiment are formed of a different material (obtained by performing nickel plating, for example) from connecting terminals 71a, 71b, 71c, and 71d. A pad-side connecting member 88' is also formed by a different material (obtained by performing nickel plating) from an electrode pad 81.

As shown in FIG. 14, a branch-side metal portion 91 of a jumper conductor 90 electrically conducts to the connecting terminals 71a, 71b, 71c, and 71d of branch conductors 51a, 51b, 51c, and 51d via the branch-side connecting members 72a', 72b', 72c', and 72d'. As shown in FIG. 15, a pad-side metal portion 92 of the jumper conductor 90 electrically conducts to the electrode pad 81 via the pad-side connecting member 88'. Since other configurations of the interleave circuit 35B are the same as those of the interleave circuit 35A of the first embodiment, common reference numbers are used to designate common portions of the first and second embodiments, and a description of those portions is omitted.

As described above, the jumper conductor 90 of the interleave circuits 35A and 35B of the present embodiments includes the branch-side metal portion 91, the pad-side metal portion 92, and the bridge portion 93. The connecting terminals 71a to 71d of the branch conductors 51a to 51d electrically conduct to the electrode pad 81 via the jumper conductor 90. Accordingly, it becomes possible to structure the conductor branch portions 61 and 62 having a larger number of connecting terminals 71a to 71d than the conventional conductor branch portions to be compact, and the conductor branch portions 61 and 62 having a higher degree of integration can be obtained.

Further, because the conductive circuit portion 35 comprises such an interleave circuit, attenuation in a high-frequency band can be further reduced, and a conductive circuit portion 35 suitable for high-speed data transfer can be obtained. Since the insular jumper conductor 90 formed by etching a part of the metal base 40 has the same thickness as the metal base body portion 40a, even if the jumper conductor 90 is provided, it is possible to prevent the thickness of the conductor branch portions 61 and 62 from being increased.

It is to be understood, in carrying out the present invention, that specific forms, structures, and arrangement of elements which constitute the interleave circuit, such as the conductor branch portions and the jumper conductor, in addition to the metal base, the insulating layer, and the first and second conductor members, may be embodied in various forms. Further, the numbers of the first and second branch conductors may be greater than four or less than four, respectively, and those numbers may be different from each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interleave circuit of a conductive circuit portion of a disk drive flexure which comprises:
   a metal base comprising a metal base body portion;
   an insulating layer which is formed on the metal base, and comprises a first surface which is in contact with the metal base and a second surface which is on a side opposite to the metal base;
   a first conductor member which is disposed on the second surface of the insulating layer, and connected to a first electrode pad; and
   a second conductor member which is disposed on the second surface of the insulating layer, and connected to a second electrode pad,
   the interleave circuit comprising:
   a plurality of first branch conductors which constitute the first conductor member;
   a plurality of second branch conductors which constitute the second conductor member, and is disposed alternately with the first branch conductors along the first branch conductors; and
   a jumper conductor having an independent shape which is a part of the metal base, and electrically insulated from the metal base body portion,
   the jumper conductor comprising:
   a branch-side metal portion which is formed at a position corresponding to connecting terminals of the first branch conductors, respectively, and electrically conducts to the connecting terminals via branch-side connecting members which penetrate through the insulating layer in a thickness direction;

a pad-side metal portion which is formed at a position corresponding to the first electrode pad, and electrically conducts to the first electrode pad via a pad-side connecting member which penetrates through the insulating layer in the thickness direction; and a bridge portion which is formed between the branch-side metal portion and the pad-side metal portion.

2. The interleave circuit of claim 1, further comprising a third conductor member passing through a space between the first electrode pad and the connecting terminals on the second surface of the insulating layer, wherein the bridge portion comprises a crossover portion which crosses over the third conductor member.

3. The interleave circuit of claim 1, wherein a length of the branch-side metal portion is greater than a length of the pad-side metal portion, and a width of the bridge portion is less than the length of the pad-side metal portion.

4. The interleave circuit of claim 2, wherein a length of the branch-side metal portion is greater than a length of the pad-side metal portion, and a width of the bridge portion is less than the length of the pad-side metal portion.

5. The interleave circuit of claim 1, wherein the branch-side metal portion extends in a longitudinal direction of the conductive circuit portion, the connecting terminals are arranged to be spaced apart from each other in the longitudinal direction of the conductive circuit portion, and the bridge portion has a shape of extending in a width direction of the conductive circuit portion.

6. The interleave circuit of claim 2, wherein the branch-side metal portion extends in a longitudinal direction of the conductive circuit portion, the connecting terminals are arranged to be spaced apart from each other in the longitudinal direction of the conductive circuit portion, and the bridge portion has a shape of extending in a width direction of the conductive circuit portion.

7. The interleave circuit of claim 3, wherein the branch-side metal portion extends in a longitudinal direction of the conductive circuit portion, the connecting terminals are arranged to be spaced apart from each other in the longitudinal direction of the conductive circuit portion, and the bridge portion has a shape of extending in a width direction of the conductive circuit portion.

8. The interleave circuit of claim 4, wherein the branch-side metal portion extends in a longitudinal direction of the conductive circuit portion, the connecting terminals are arranged to be spaced apart from each other in the longitudinal direction of the conductive circuit portion, and the bridge portion has a shape of extending in a width direction of the conductive circuit portion.

9. The interleave circuit of claim 1, wherein the conductive circuit portion includes a pair of conductor members for writing and a pair of conductor members for reading which are connected to a magnetic head, a conductor member, which is one of the pair of conductor members for writing, comprises the first branch conductors, and the other conductor member for writing comprises the second branch conductors.

* * * * *